United States Patent
Feldmann et al.

(10) Patent No.: US 9,506,368 B2
(45) Date of Patent: Nov. 29, 2016

(54) SEAL CARRIER ATTACHMENT FOR A TURBOMACHINE

(71) Applicant: MTU Aero Engines AG, Munich (DE)

(72) Inventors: Manfred Feldmann, Eichenau (DE); Janine Sangl, Dachau (DE); Norbert Schinko, Munich (DE)

(73) Assignee: MTU Aero Engines AG, Munich (DE)

( * ) Notice: Subject to any disclaimer, the term of this patent is extended or adjusted under 35 U.S.C. 154(b) by 519 days.

(21) Appl. No.: 14/064,844

(22) Filed: Oct. 28, 2013

(65) Prior Publication Data

US 2014/0119902 A1  May 1, 2014

(30) Foreign Application Priority Data

Oct. 30, 2012 (EP) ..................... 12190529

(51) Int. Cl.
*F01D 9/04* (2006.01)
*F01D 11/08* (2006.01)
*F01D 11/12* (2006.01)
*F01D 25/24* (2006.01)

(52) U.S. Cl.
CPC ............. *F01D 11/08* (2013.01); *F01D 9/042* (2013.01); *F01D 11/12* (2013.01); *F01D 11/122* (2013.01); *F01D 25/246* (2013.01); *F05D 2230/90* (2013.01); *F05D 2240/11* (2013.01); *F05D 2240/80* (2013.01); *F05D 2260/30* (2013.01); *Y02T 50/673* (2013.01)

(58) Field of Classification Search
CPC .......... F01D 9/04; F01D 11/08; F01D 11/12; F01D 11/122; F01D 25/24; F01D 25/246; F05D 2240/11; F05D 2240/80; F05D 2230/90; F05D 2260/30
See application file for complete search history.

(56) References Cited

U.S. PATENT DOCUMENTS

| 2,903,237 | A | | 9/1959 | James et al. |
| 5,333,995 | A | * | 8/1994 | Jacobs ................ F01D 25/246 415/173.1 |
| 6,129,513 | A | * | 10/2000 | Halliwell ............. F01D 11/025 415/173.4 |
| 8,011,879 | B2 | | 9/2011 | Guimbard et al. |
| 8,177,493 | B2 | * | 5/2012 | Castel ...................... F01D 9/04 415/173.4 |
| 9,169,739 | B2 | * | 10/2015 | Mironets ................ F01D 11/12 |
| 2004/0213666 | A1 | | 10/2004 | Gieg et al. |

(Continued)

FOREIGN PATENT DOCUMENTS

| DE | 101 22 464 | 3/2002 |
| DE | 10122464 | 3/2002 |
| DE | 102009037620 | 2/2011 |
| EP | 1106785 | 6/2001 |
| EP | 1231420 | 8/2002 |

(Continued)

*Primary Examiner* — Ninh H Nguyen
(74) *Attorney, Agent, or Firm* — Davidson, Davidson & Kappel, LLC

(57) ABSTRACT

A housing structure for a turbomachine having a stationary blade ring annularly surrounding a flow channel, and having a seal carrier ring which also annularly surrounds the flow channel, the stationary blade ring and the seal carrier ring being connected to each other, and either the stationary blade ring or the seal carrier ring having a one-sidedly open receptacle in the radial direction in relation to the flow channel and a radially projecting engagement area which corresponds to the connected seal carrier ring or stationary blade ring and which is held in a form-fitting manner in the axial direction and in the radial direction in the direction of the closed side of the receptacle but is freely movable with respect to the connected receptacle and the seal carrier ring or stationary blade ring having this receptacle in the radially opposite direction in the direction of the receptacle opening.

18 Claims, 2 Drawing Sheets

(56) References Cited

U.S. PATENT DOCUMENTS

2005/0004810 A1* 1/2005 Tanaka ............... F01D 9/04
 415/173.1
2012/0141253 A1 6/2012 Weidmann

FOREIGN PATENT DOCUMENTS

| | | |
|---|---|---|
| EP | 2267279 | 12/2010 |
| GB | 2239678 A | 7/1991 |
| GB | 2249356 A | 5/1992 |

* cited by examiner

SEAL CARRIER ATTACHMENT FOR A TURBOMACHINE

This claims the benefit of European Patent Application No. EP 12190529.3, filed Oct. 30, 2012 and hereby incorporated by reference herein.

The present invention relates to a housing structure for a turbomachine, in particular for a gas turbine or an aircraft engine.

BACKGROUND

In turbomachines such as stationary gas turbines or aircraft engines, air is taken in along a flow channel, compressed and combusted together with fuel in a combustion chamber, the combustion gases being subsequently expelled via the flow channel for the purpose of driving rotors in a turbine.

The flow channel is circumferentially surrounded by a housing structure, the rotors or moving blades provided on the rotors being required to abut the housing structure as tightly as possible to avoid flow losses. To achieve this, so-called rub coatings or run-in coatings are provided on the inside of the housing in the area of the rotating moving blades and are in rubbing contact with sealing tips situated on the radially outer ends of the moving blades. A radial seal may be achieved with the aid of the engagement of the sealing tips with the run-in coatings or rub coatings for many different operating states of the gas turbine or the aircraft engine having different longitudinal expansions. A moving blade tip seal of this type is also referred to as an outer air seal (OAS).

The run-in coatings are usually designed as a plurality of seal carrier segments situated in the circumferential direction which together form a seal carrier ring. The seal carrier segments, which are also referred to as outer air seal segments, or the seal carrier ring must be attached in the radial and axial directions as well as in the circumferential direction to enable the sealing effect to be reliably achieved.

According to the prior art, the axial and radial fixing of the seal carrier ring or the corresponding segments thereof is provided by clamping or hooking to corresponding outer housing components.

SUMMARY OF THE INVENTION

However, the problem exists that this approach may make the assembly of the seal carrier segments or the seal carrier ring complex, and the freedom of designing the housing structure or executing the stationary blade suspension may be limited, with the result that aerodynamically unfavorable conditions may set in.

Examples of corresponding housing structures or the arrangement of so-called outer air seal segments are described in the patent documents U.S. Pat. No. 6,129,513 A, EP 2 267 279 A1, DE 101 22 464 C1, U.S. Pat. No. 8,011,879 B2 and EP 1 106 785 B1.

It is an object of the present invention to provide a housing structure for a turbomachine, in which a so-called seal carrier ring or segments thereof may be situated in an efficient and easy manner, a significant design freedom being simultaneously ensured for adjacent components and components of the housing structure.

The present invention provides for support or connection of the seal carrier ring or segments thereof on or to a stationary blade ring or its segments, in particular in the area of the so-called vane platform, in such a way that a receptacle, which is open on one side in the radial direction, is provided on either the stationary blade ring or the seal carrier ring. The radial direction in this case is understood to be the radial direction with respect to the flow direction in the flow channel. A radially projecting engagement area of the corresponding other component, i.e., the seal carrier ring or the stationary blade ring, engages with this one-sidedly open receptacle, so that the seal carrier ring and stationary blade ring or their segments are held in a form-fitting manner in the axial direction and in the radial direction in the direction of the closed side of the receptacle, while the two components are freely movable in relation to each other in a radially opposite direction in the direction of the receptacle opening. This may both simplify assembly and allow a more variable design of the surrounding components. The radial attachment in the direction away from the receptacle opening is removed from the connecting area between the stationary blade ring and the seal carrier ring, the so-called liner attachment, which causes, for example, the seal carrier ring to be held between outer housing components and the stationary blade ring.

It may be advantageous, in particular, to situate the connecting area or the receptacle and the engagement area in the area of the so-called vane platform of the stationary blade ring, which projects from the stationary blades in a manner comparable to the shroud of moving blades in the axial direction or having at least one axial direction component for the purpose of limiting the flow channel.

The one-sidedly open receptacle may have an essentially U-shaped design and be formed either by material recesses or by a corresponding arrangement of webs, for example in the form of bent metal sheets or the like.

The radially projecting engagement area, which is complementary to the receptacle, may be formed by a radially running web or corresponding components.

Due to radially overlapping wall areas of the radially projecting engagement area and the one-sidedly open receptacle, a sealing effect may additionally be achieved which provides a sealing surface surrounding the flow channel at least in segments and which extends in the radial direction.

The connection according to the present invention between the stationary blade ring and the seal carrier ring may also be provided, in particular, in the case of a connection of the seal carrier ring with a stationary blade ring situated upstream, which may be advantageous due to thermal expansion phenomena.

BRIEF DESCRIPTION OF THE DRAWINGS

The attached drawings show a purely schematic representation as follows.

DETAILED DESCRIPTION

Additional advantages, characteristics and features of the present invention are clarified in the following detailed description of the exemplary embodiments. However, the present invention is not limited to these exemplary embodiments.

Figure 1:
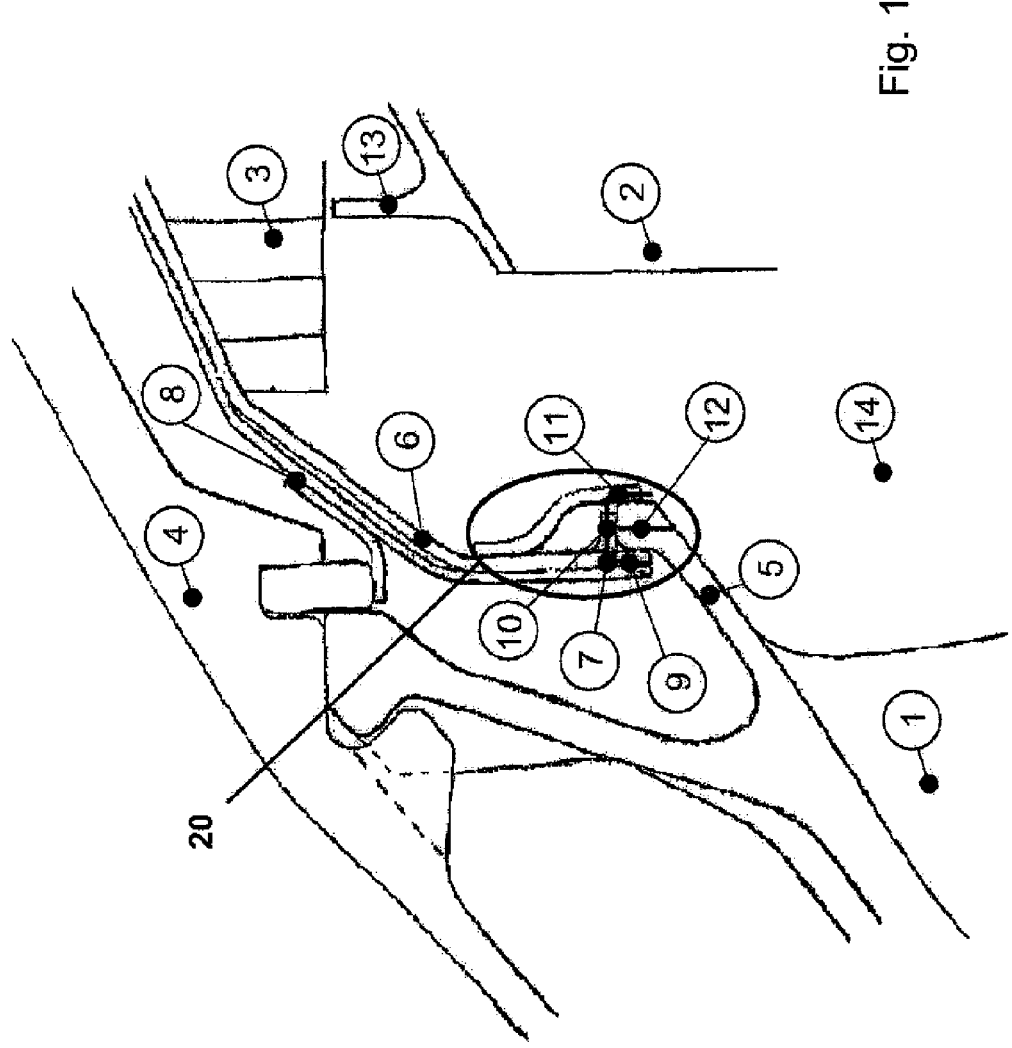
FIG. 1 shows a partial cross section and a first housing structure of an aircraft engine according to the present invention.

FIG. 1 shows a partial cross section of a housing area of an aircraft engine, the housing annularly surrounding a flow channel 14. Stationary blades 1 and moving blades 2, which conduct the flow fluid or are driven thereby, are situated in flow channel 14. Moving blades 2 have so-called sealing tips 13 on their radially outer ends, which are able to engage with a run-in coating 3 to form a so-called outer air seal (OAS), Due to the engagement of sealing tips 13 with run-in coating 3, a radial seal may be provided between moving blades 2 and the housing, so that no flow fluid is able to flow past moving blades 2 without driving them, thus generally avoiding flow losses. Run-in coating 3 is situated on a so-called seal carrier ring 6, seal carrier ring 6 being divided into a plurality of segments in the circumferential direction.

Similar to seal carrier ring 6, stationary blades 1, together with platforms 5 (so-called vane platforms) which project in the axial direction, form a circumferential stationary blade ring which is connected to seal carrier ring 6 to form an inner housing wall opposite flow channel 14. Additional sealing and insulating elements as well as heat shields 8 and the like, which are not discussed in greater detail herein, are provided between outer housing wall 4 and stationary blade ring 5 or seal carrier ring 6.

In the illustrated exemplary embodiment in FIG. 1, stationary blade ring 5 has a radially projecting web 12 circumferentially in the circumferential direction, which is additionally indicated purely schematically in a dashed-line representation.

Radially projecting web 12 engages with a receptacle 7, which is provided with a U-shaped design and is open radially to the inside. In the illustrated exemplary embodiment, receptacle 7 is formed by web areas or sections 9, 10 and 11 of seal carrier ring 6. The U shape is represented once again with greater emphasis by an additionally drawn U. If radially projecting web 12 is situated in receptacle 7, seal carrier ring 6 or its individual segments is/are held in a form-fitting manner inwardly in the radial direction and in the axial direction. Seal carrier ring 6 or the individual elements may be readily lifted from stationary blade ring 5 in the radial direction to the outside, since no form-fitting holding is provided in this direction. In the assembled state, seal carrier ring 6 is held by outer housing components in the radial direction to the outside. Accordingly, an attachment of stationary blade ring 5 or of seal carrier ring 6 or individual segments thereof in the radial direction to the outside in connecting area 20 of the radially projecting web and receptacle 7 may be dispensed with. This results in an easier assembly ability, an effective attachment simultaneously being possible, which may additionally provide a sealing effect. Due to sections 9, 10 and 11 of the receptacle, which abut web 12, a seal may be achieved. It is sufficient to achieve the sealing effect if web 12 and one of sections 9, 10 and 11 of receptacle 7 abut each other circumferentially.

In FIG. 1, one-sidedly open receptacle 7 is designed in such a way that the receptacle opening is situated toward the inside in the radial direction, while radially projecting web 12 points to the outside. In the exemplary embodiment in FIG. 2, the relationships are precisely reversed, the remaining components, such as stationary blades 1, moving blades 2, outer housing part 4, stationary blade ring 5 and seal carrier ring 6, are identical to the specific embodiment in FIG. 1 and are therefore provided with the same reference numerals.

Figure 2:
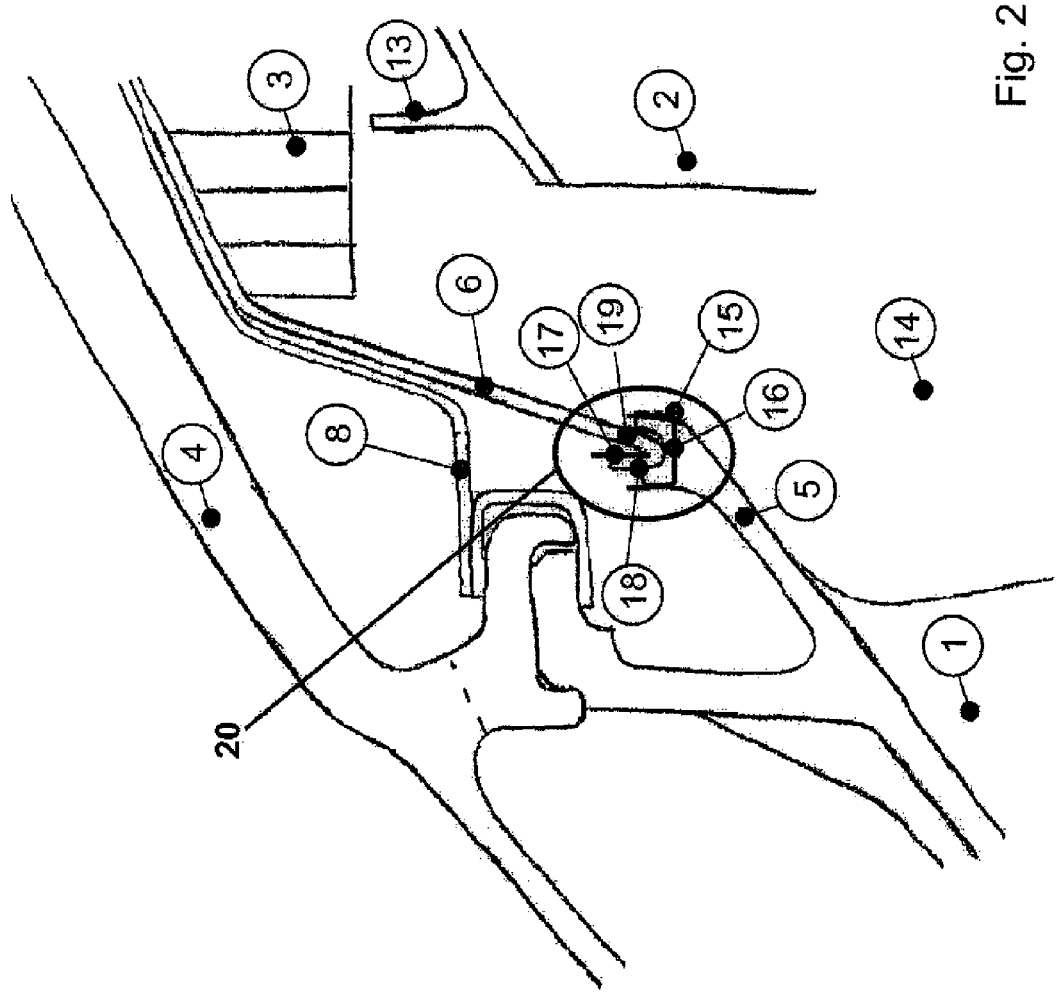
FIG. 2 shows a partial sectional view of a second specific embodiment of a housing structure of an aircraft engine according to the present invention.

In the specific embodiment in FIG. 2, receptacle 15 is designed as a material recess in platform 5 of the stationary blade ring, the superimposed U clarifying the cross-sectional shape of receptacle 15.

Radially projecting web 17, which, in turn, is clarified by a superimposed schematic representation having a corresponding line, is formed by a crimped edge having corresponding web areas 18, 19 in seal carrier ring 6 in the specific embodiment in FIG. 2, the crimped edge being designed in such a way that it fits exactly into receptacle 15.

Once again, a form fit is established inwardly in the radial direction as well as in the axial direction, while seal carrier ring 6, or individual segments thereof, may be removed unhindered from the receptacle to the outside in the radial direction if the outer housing components would not prevent a radially outward directed movement of seal carrier ring 6. A design of this type also achieves an easier assembly and simultaneously a stable and exact attachment, since, among other things, the function of a radial attachment in one direction is eliminated in connecting area 20 of receptacle 15 and radially projecting web 17, and this function has been assigned to the outer housing components.

Due to the corresponding arrangement described in FIGS. 1 and 2, a cavity above platform 5 of the blade ring segment may also be minimized, which provides aerodynamic advantages, since disadvantageous swirls are avoided.

Although the present invention was described in detail on the basis of exemplary embodiments, the present invention is not limited to these exemplary embodiments, but instead modifications are possible in such a way that individual features may be omitted or different combinations of features may be implemented, provided that this does not depart from the scope of protection of the appended claims. The present disclosure covers all combinations of all individual features presented.

What is claimed is:

1. A housing structure for a turbomachine comprising:
a stationary blade ring and a seal carrier ring annularly surrounding a flow channel of the turbomachine, the stationary blade ring and the seal carrier ring being connected to each other,
either the stationary blade ring or the seal carrier ring having a one-sidedly open receptacle in a radial direction in relation to the flow channel; and
a radially projecting engagement area corresponding to the other of the seal carrier ring or stationary blade ring and accommodatable in the receptacle so as to be held in a form-fitting manner in the axial direction and in the radial direction in the direction of a closed side of the receptacle but freely movable with respect to the receptacle and the seal carrier ring or stationary blade ring having the receptacle in the radially opposite direction in the direction of the receptacle opening, wherein the seal carrier ring has a run-in coating, moving blade tips rubbing against the run in coating.

2. The housing structure as recited in claim 1 wherein the stationary blade ring has an axially projecting platform annularly surrounding the flow channel, a connecting area between the stationary blade ring and the seal carrier ring being situated on the platform.

3. The housing structure as recited in claim 1 wherein the receptacle has an essentially U-shaped design.

4. The housing structure as recited in claim 1 wherein the receptacle is formed by a material recess or by a web arrangement.

5. The housing structure as recited in claim 1 wherein the radially projecting engagement area is formed by a radially running web.

6. The housing structure as recited in claim 1 wherein the seal carrier ring is held between the stationary blade ring and outer housing components in the radial direction.

7. The housing structure as recited in claim 1 wherein the radially projecting engagement area and the receptacle form a seal with the aid of radially overlapping wall areas.

8. The housing structure as recited in claim 7 wherein the seal provides a circumferential sealing surface extending in the radial direction.

9. The housing structure as recited in claim 1 wherein the receptacle has multiple sections, in cross section, defining a U-shaped design of the receptacle, at least one single section circumferentially abutting the radially projecting engagement area.

10. The housing structure as recited in claim 1 wherein the stationary blade ring is situated upstream from the seal carrier ring.

11. The housing structure as recited in claim 1 wherein the seal carrier ring or the stationary blade ring has multiple segments in the circumferential direction.

12. A housing structure for a turbomachine comprising:
a stationary blade ring and a seal carrier ring annularly surrounding a flow channel of the turbomachine, the stationary blade ring and the seal carrier ring being connected to each other,
either the stationary blade ring or the seal carrier ring having a one-sidedly open receptacle in a radial direction in relation to the flow channel; and
a radially projecting engagement area corresponding to the other of the seal carrier ring or stationary blade ring and accommodatable in the receptacle so as to be held in a form-fitting manner in the axial direction and in the radial direction in the direction of a closed side of the receptacle but freely movable with respect to the receptacle and the seal carrier ring or stationary blade ring having the receptacle in the radially opposite direction in the direction of the receptacle opening, wherein the receptacle has multiple sections, in cross section, defining a U-shaped design of the receptacle, at least one single section circumferentially abutting the radially projecting engagement area.

13. The housing structure as recited in claim 12 wherein the stationary blade ring has an axially projecting platform annularly surrounding the flow channel, a connecting area between the stationary blade ring and the seal carrier ring being situated on the platform.

14. The housing structure as recited in claim 12 wherein the receptacle is formed by a material recess or by a web arrangement.

15. The housing structure as recited in claim 12 wherein the radially projecting engagement area is formed by a radially running web.

16. The housing structure as recited in claim 12 wherein the seal carrier ring is held between the stationary blade ring and outer housing components in the radial direction.

17. The housing structure as recited in claim 12 wherein the radially projecting engagement area and the receptacle form a seal with the aid of radially overlapping wall areas.

18. The housing structure as recited in claim 17 wherein the seal provides a circumferential sealing surface extending in the radial direction.

* * * * *